United States Patent [19]

Phillips et al.

[11] 4,090,778
[45] May 23, 1978

[54] TERMINATING OPTICAL FIBERS AND OPTICAL FIBER CONNECTOR

[75] Inventors: Michael James Phillips, Stanstead; John David Archer, Halifax, both of England

[73] Assignee: ITT Industries, Inc., New York, N.Y.

[21] Appl. No.: 776,596

[22] Filed: Mar. 11, 1977

[30] Foreign Application Priority Data

Apr. 1, 1976 United Kingdom ............... 13161/76

[51] Int. Cl.² ............................................. G02B 5/14
[52] U.S. Cl. .............................. 350/96.20; 350/96.21
[58] Field of Search ................................... 350/96 C

[56] References Cited

U.S. PATENT DOCUMENTS

| 3,902,784 | 9/1975 | Dakss et al. | 350/96 C X |
|---|---|---|---|
| 3,982,815 | 9/1976 | Nakayama | 350/96 C |
| 4,015,894 | 4/1977 | Rocton | 350/96 C |
| 4,026,633 | 5/1977 | Crick | 350/96 C |

OTHER PUBLICATIONS

Thiel et al., "In–Line Connectors for Multimode Optical Wave-Guide Bundles" Applied Optics, vol. 13, No. 2, Feb. 1974, pp. 240–242.

*Primary Examiner*—John K. Corbin
*Assistant Examiner*—Rolf Hille
*Attorney, Agent, or Firm*—Thomas L. Peterson

[57] ABSTRACT

An optical fiber connector assembly employs a tubular alignment portion in which two watch jewels, one fitted to each fiber end, are aligned. The jewels are mounted on the ends of ferrules and have diameters greater than that of the ferrules so that alignment of the fibers is made off the jewels rather than the ferrules.

10 Claims, 4 Drawing Figures

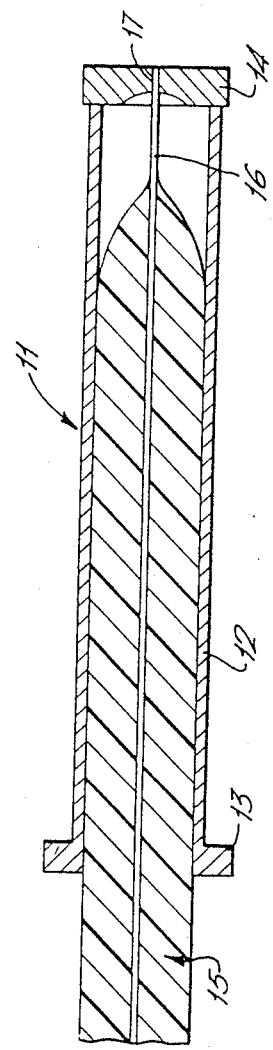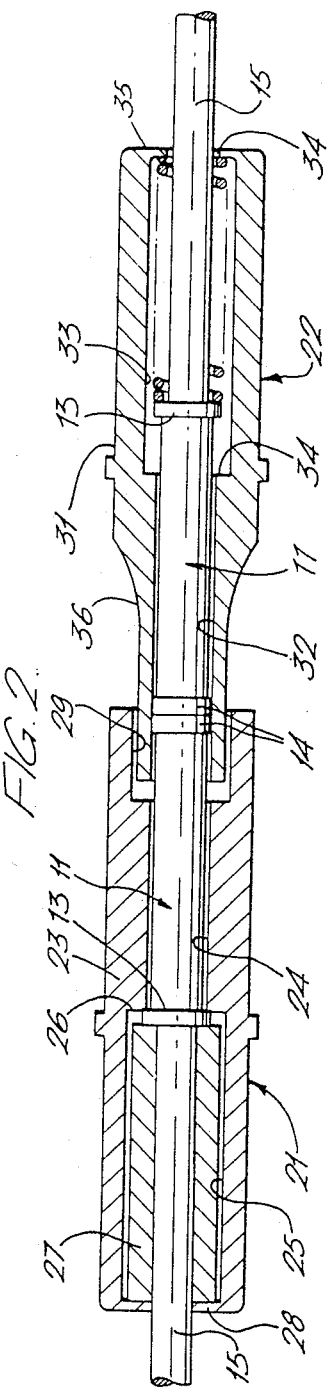

TERMINATING OPTICAL FIBERS AND OPTICAL FIBER CONNECTOR

BACKGROUND OF THE INVENTION

This invention relates to an arrangement for coupling optical fibers and, in particular, to a demountable optical fiber connector assembly and an optical fiber ferrule for use in such assembly.

In an optical connector capable of joining two single fibers of very small dimensions it is essential to provide close tolerance alignment between the ends of the two fibers in order to minimize the coupling losses. In principle, it is possible to provide as alignment reference surfaces the bare fibers themselves, but in practice this is difficult due to their extreme fragility. Instead, it is usually preferred to enclose each optical fiber in a protective cylindrical ferrule, usually made from metal. The fiber is inserted from the rear of the ferrule and secured at the front so that the axes of the fiber and ferrule are accurately concentric. Two similarly terminated fibers can then be aligned by enclosing the ferrules in a guide which has either a sliding fit or an interference fit with the ferrules. Butting is ensured by an axial spring or similar means. Various means have been proposed for ensuring the concentricity of the fiber and ferrule axes. For example, co-pending application Ser. No. 679,759, filed Apr. 23, 1976, entitled "Termination of Optical Fibers", of M. J. Phillips and A. M. Crick, describes the use of a pierced watchmakers bearing jewel mounted on the end of a ferrule with the fiber end positioned in the jewel hole. Such jewels are available as standard components with hole sizes suitable for a wide range of fiber diameters, and outside diameters maintained within very close limits. In addition, the concentricity of the jewel hole to its outside diameter is very accurately controlled.

The aforementioned optical fiber connectors employing watchmakers jewels require the jewel to have a light press fit within the bore of an accurately machined ferrule. In particular, the bore, outside diameter and concentricity of the bore to outside diameter must be maintained within limits of the order of $10^{-4}$ inches. The present invention eliminates the need for these accurate dimensions by utilizing the outside diameter of the jewel directly as the alignment reference surface.

SUMMARY OF THE INVENTION

According to one aspect of the invention, there is provided an optical fiber ferrule adapted to couple to a second ferrule terminated fiber. The ferrule comprises a tubular member for receiving the fiber. A watch jewel is mounted at one end of the tubular member. The bore of the watch jewel receives and locates the fiber end. The watch jewel has an outer diameter larger than that of the tubular member. The ferrule is adapted to be inserted into a tubular alignment member in which the watch jewel has a close sliding or interference fit so as to couple to a second ferrule.

According to another aspect of the invention, there is further provided an optical connector assembly, including first and second connector members each secured to a respective fiber and each having a watch jewel in the bore of which the fiber end is located. One of said connector members has a tubular alignment portion in which the watch jewels have a close sliding or interference fit. The watch jewels are so mounted in their respective connector members that, when the connector members are mated, the watch jewels are located and held in alignment by the tubular portion.

BRIEF DESCRIPTION OF THE DRAWINGS

FIG. 1 is a longitudinal section of an optical fiber termination employing the novel ferrule of the present invention;

FIG. 2 is a partial, longitudinal sectional view of a connector assembly employing a pair of ferrules of the type shown in FIG. 1.

DESCRIPTION OF THE PREFERRED EMBODIMENTS

Figure 3:
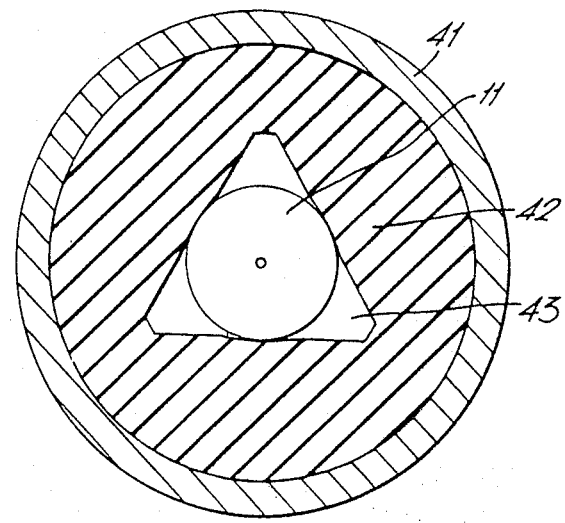
FIGS. 3 and 4 are cross-sections of alternative alignment guides for the ferrules.

Referring to FIG. 1, the optical fiber ferrule 11 comprising a tubular member 12 of circular cross-section which may be manufactured from metal or cast from a plastic resin. The tubular member has a flange 13 at its rear end. A watch jewel 14 is secured to the forward end of the member 12. The jewel 14 may be secured to the tubular member 12 by an adhesive and has a diameter slightly greater than that of the tubular member. The inner diameter of the tube 12 is of a suitable size for receiving a sheathed optical fiber 15 with the bared fiber 16 of the sheathed fiber located in the bore 17 of the jewel 14.

The connector assembly of FIG. 2 employs a pair of ferrules as shown in FIG. 1, one mounted in each of a pair of female and male connector members 21 and 22, respectively.

The female connector member 21 comprises a tubular housing 23 having an axial bore 24 which receives the ferrule 11. The rearward portion of the housing 23 has an enlarged bore 25 defining a shoulder 26 against which the flange 13 of the ferrule 11 is held in abutment by a tubular spacer 27. The rearward end 28 of the housing 23 is swaged over to secure the spacer and the ferrule in the bores 24 and 25. The forward end of the housing 23 has a second enlarged bore 29 for receiving the mating male connector 22.

The male connector member 22 is of somewhat similar construction and comprises a tubular housing 31 having an axial bore 32 which receives a second ferrule 11. The bore is of such a size that the watch jewel 14 of both its own ferrule and that of the corresponding ferrule have an interference fit or a close sliding fit in the bore 32. The rearward portion of the housing 31 has an enlarged bore 33 defining a shoulder 34 against which the flange 13 of the ferrule 11 is held in abutment by a coil spring 34 when the connector member is uncoupled from its corresponding female connector member. The rearward end 35 of the housing 31 is swaged over so as to retain the spring 34. The forward end of the housing 31 has an extending nose portion 36 of reduced outer diameter which has a sliding fit in the enlarged bore 29 of the female connector member 21.

The two connector members are assembled as shown in FIG. 2 by inserting the nose portion 36 of the male connector in the forward enlarged bore 29 of the female connector. As the connector members are pushed further into engagement, the watch jewel of the female connector ferrule enters the bore 32 of the male connector until it abuts the male connector jewel. The slight interference or close sliding fit of the two jewels in the bore 32 ensures that the two jewels, and hence the fibers to be coupled, are accurately aligned.

FIG. 3 shows an alternative method of mounting the ferrule of FIG. 1 in a connector housing. The tubular housing 41 contains a deformable, e.g. silicone rubber, insert 42 having a triangular cross-section longitudinal bore 43. When the ferrules 11 are inserted into the opposite ends of the bore, the walls of the insert 42 deform slightly so as to align the jewels and locate them in coaxial relation with the body 41.

Figure 4:
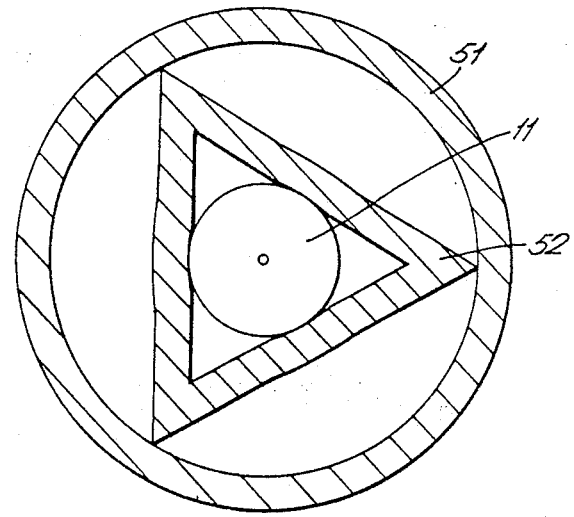

FIG. 4 shows a modification of the deformable alignment guide of FIG. 3. A tubular outer casing 51 is fitted with a resilient guide 52 of delta cross-section. As before, when the ferrules 11 are inserted into the bore of the delta guide 52, the walls of the guide deform slightly so as to grip and align the jewels and locate them in coaxial relation with the body 51.

Thus, in accordance with the principal feature of the invention, precise lateral alignment of the fibers is effected by using the pierced watchmakers bearing jewels directly as the alignment reference surfaces, rather than the tubular member 12, and by laterally aligning said jewels in a suitable alignment sleeve.

What is claimed is:

1. An optical fiber ferrule comprising:
   a tubular member having a forward end;
   a pierced watch bearing jewel mounted at the forward end of said tubular member having an aperture therein adapted to receive the end of an optical fiber mounted lengthwise in said member; and
   said jewel having an outer diameter greater than the cross-section of said tubular member at said forward end for directly using said jewel as alignment reference surfaces.

2. An optical fiber termination as set forth in claim 1 wherein:
   said forward end of said tubular member has an end face; and
   said jewel has a rear surface mounted against said end face.

3. An optical fiber termination as set forth in claim 1 wherein:
   said aperture is coaxial with the center axis of said tubular member.

4. An optical fiber ferrule as set forth in claim 1 including:
   a sheathed optical fiber mounted lengthwise in said tubular member and having its sheathing terminating within said member leaving a forward unsheathed end portion threaded into said aperture.

5. An optical fiber connector comprising:
   mating first and second connector members each having a pierced watch bearing jewel therein adapted to receive in the aperture therein the end of an optical fiber;
   each said jewel is mounted on the forward end of a tubuler member and has an outer diameter greater than the cross-section of said tubular member at said forward end;
   said first connector member having a tubular alignment portion in which said jewels have a close sliding or interference fit; and
   said jewels being mounted in their respective connector members so that, when said connector members are mated, said jewels are located and held in alignment by said tubular portion.

6. An optical fiber connector as set forth in claim 5 wherein:
   said second connector member has a recess in its forward end slidably receiving said tubular portion of said first connector member; and
   said jewel in said second connector member is mounted in said recess and positioned to enter into said tubular portion when said connector members are mated.

7. An optical fiber connector as set forth in claim 6 wherein:
   the jewel in one of said connector members is fixed against axial movement therein;
   the jewel in the other connector member is axially slidable therein; and
   means in said other connector member biases said jewel forwardly therein.

8. An optical fiber connector as set forth in claim 7 wherein:
   said slidable jewel is mounted in said tubular portion of said first connector member.

9. An optical fiber connector as set forth in claim 5 wherein:
   said tubular portion comprises an elastomeric body having a bore therethrough of triangular cross-section; and
   said bore being dimensioned so that the walls of said bore have an interference fit with said jewels.

10. An optical fiber connector as set forth in claim 5 wherein:
    said tubular portion comprises a resilient sleeve of delta cross-section; and
    said sleeve being dimensioned so that the walls thereof will deform when said jewels are inserted therein.

* * * * *